(12) United States Patent
Mulase et al.

(10) Patent No.: US 11,523,171 B2
(45) Date of Patent: Dec. 6, 2022

(54) INFORMATION PROCESSING DEVICE

(71) Applicant: Sony Interactive Entertainment Inc., Tokyo (JP)

(72) Inventors: Yurika Mulase, Tokyo (JP); Daisuke Kawamura, Tokyo (JP)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 17/419,857

(22) PCT Filed: Jan. 16, 2020

(86) PCT No.: PCT/JP2020/001307
§ 371 (c)(1),
(2) Date: Jun. 30, 2021

(87) PCT Pub. No.: WO2020/149366
PCT Pub. Date: Jul. 23, 2020

(65) Prior Publication Data
US 2022/0078510 A1 Mar. 10, 2022

(30) Foreign Application Priority Data
Jan. 17, 2019 (JP) .............................. JP2019-006063

(51) Int. Cl.
*H04N 21/431* (2011.01)
*H04N 21/485* (2011.01)
*A63F 13/86* (2014.01)

(52) U.S. Cl.
CPC ......... *H04N 21/4316* (2013.01); *A63F 13/86* (2014.09); *H04N 21/4858* (2013.01)

(58) Field of Classification Search
CPC . A63F 13/86; H04N 21/4316; H04N 21/4858
(Continued)

(56) References Cited

U.S. PATENT DOCUMENTS 7,966,638 B2 * 6/2011 Gossweiler, III .... H04N 21/262
725/44
8,471,944 B2 6/2013 Nonaka
(Continued)

FOREIGN PATENT DOCUMENTS

JP 2003250146 A 9/2003
JP 2009124606 A 6/2009
(Continued)

OTHER PUBLICATIONS

International Search Report for corresponding PCT Application No. PCT/JP2020/001307, 6 pages, dated Mar. 24, 2020.
(Continued)

*Primary Examiner* — Dominic D Saltarelli
(74) *Attorney, Agent, or Firm* — Matthew B. Dernier, Esq.

(57) ABSTRACT

An information processing device that presents a distributed video selection screen including a plurality of distributed videos as selection candidates to a user, and which, in the distributed video selection screen, presents, in association with each of the plurality of distributed videos, distribution status information related to a distribution status of the distributed video. The information processing device displays, as the distribution status information, a viewer image including a number of unit images, the number being determined according to the number of viewers viewing the corresponding distributed video, in the vicinity of an image representing the distributed video.

7 Claims, 5 Drawing Sheets

(58) Field of Classification Search
USPC .......................................................... 725/40
See application file for complete search history.

(56) References Cited

U.S. PATENT DOCUMENTS

| | | | |
|---|---|---|---|
| 9,055,311 B1* | 6/2015 | Jayaram | H04L 67/306 |
| 9,889,379 B2 | 2/2018 | Nogami | |
| 9,942,519 B1* | 4/2018 | Pan | H04N 21/47 |
| 10,284,812 B1* | 5/2019 | Van Os | H04N 21/47 |
| 10,299,003 B2 | 5/2019 | Sakai | |
| 10,897,637 B1* | 1/2021 | Pham | H04N 21/23406 |
| 2002/0112239 A1* | 8/2002 | Goldman | H04H 60/64 |
| | | | 348/E7.075 |
| 2005/0275715 A1* | 12/2005 | Shingu | H04N 7/147 |
| | | | 348/E7.083 |
| 2009/0133081 A1 | 5/2009 | Sakai | |
| 2009/0293079 A1* | 11/2009 | McKee | H04N 21/4788 |
| | | | 725/10 |
| 2010/0005393 A1 | 1/2010 | Tokashiki | |
| 2011/0043651 A1 | 2/2011 | Nonaka | |
| 2013/0238467 A1 | 9/2013 | Iwabuchi | |
| 2014/0349749 A1 | 11/2014 | Nogami | |
| 2015/0074718 A1* | 3/2015 | Moguillansky | H04N 21/26291 |
| | | | 725/40 |
| 2015/0128195 A1 | 5/2015 | Kunigita | |

FOREIGN PATENT DOCUMENTS

| | | |
|---|---|---|
| JP | 2010066790 A | 3/2010 |
| JP | 2011044936 A | 3/2011 |
| JP | 2014226359 A | 12/2014 |
| JP | 2015186250 A | 10/2015 |
| JP | 2016225967 A | 12/2016 |
| JP | 2017121021 A | 7/2017 |
| WO | 2008090859 A1 | 7/2008 |
| WO | 2012096013 A1 | 7/2012 |
| WO | 2013099392 A1 | 7/2013 |

OTHER PUBLICATIONS

International Preliminary Report on patentability and Written Opinion for corresponding PCT Application No. PCT/JP2020/001307, 18 pages, dated Jul. 29, 2021.
Notice of Reasons for Refusal for corresponding JP Application No. 2020-566475, 9 pages, dated Apr. 13, 2022.

* cited by examiner

INFORMATION PROCESSING DEVICE

TECHNICAL FIELD

The present invention relates to an information processing device that displays a video that someone else distributes, an information processing system, an information processing method, and a program.

BACKGROUND ART

An information processing device such as a home game device, for example, may receive and display a video such as a play video of a game that someone else is distributing in real time.

SUMMARY

Technical Problem

The information processing device described above may present a plurality of distributed videos as selection candidates in order for a user to select a desired distributed video from the plurality of distributed videos. When the user selects such a distributed video, the user is not merely selecting based on the content of the video being distributed. A distribution status of the distributed video, such as how exciting the distributed video is for viewers, is an element that affects the selection of the distributed video. Accordingly, a user interface that enables the user to more easily recognize the distribution status of distributed videos is desired.

The present invention is made in consideration of the aforementioned actual circumstances, and one object of the present invention is to provide an information processing device, an information processing system, an information processing method, and a program that, when presenting a user with a plurality of distributed videos that are selection candidates, can enable the user to more easily recognize the distribution status of the distributed videos.

Solution to Problem

An information processing device according to one aspect of the present invention includes a distributed video selection screen presentation unit that presents to a user a distributed video selection screen that includes a plurality of distributed videos as selection candidates, and a distribution status information presentation unit that presents, in the distributed video selection screen and in association with each of the plurality of distributed videos, distribution status information relating to a distribution status of the distributed video. As the distribution status information, the distribution status information presentation unit displays, in a vicinity of an image that represents a corresponding distributed video, a viewer image that includes a number of unit images determined according to the number of viewers who are currently viewing the corresponding distributed video.

An information processing method according to one aspect of the present invention includes a distributed video selection screen presentation step of presenting to a user a distributed video selection screen that includes a plurality of distributed videos as selection candidates, and a distribution status information presentation step of presenting, in the distributed video selection screen and in association with each of the plurality of distributed videos, distribution status information relating to a distribution status of the distributed video. In the distribution status information presentation step, as the distribution status information in a vicinity of an image that represents a corresponding distributed video, a viewer image that includes a number of unit images determined according to the number of viewers who are currently viewing the corresponding distributed video is displayed.

A program according to one aspect of the present invention is a program for causing a computer to execute a distributed video selection screen presentation step of presenting to a user a distributed video selection screen that includes a plurality of distributed videos as selection candidates, and a distribution status information presentation step of presenting, in the distributed video selection screen and in association with each of the plurality of distributed videos, distribution status information relating to a distribution status of the distributed video. In the distribution status information presentation step, as the distribution status information in a vicinity of an image that represents a corresponding distributed video, a viewer image that includes a number of unit images determined according to the number of viewers who are currently viewing the corresponding distributed video is displayed. This program may be provided by being stored in a computer-readable, non-transitory information storage medium.

DESCRIPTION OF EMBODIMENT

Description is given in detail below regarding an embodiment of the present invention, with reference to the drawings.

Figure 1:
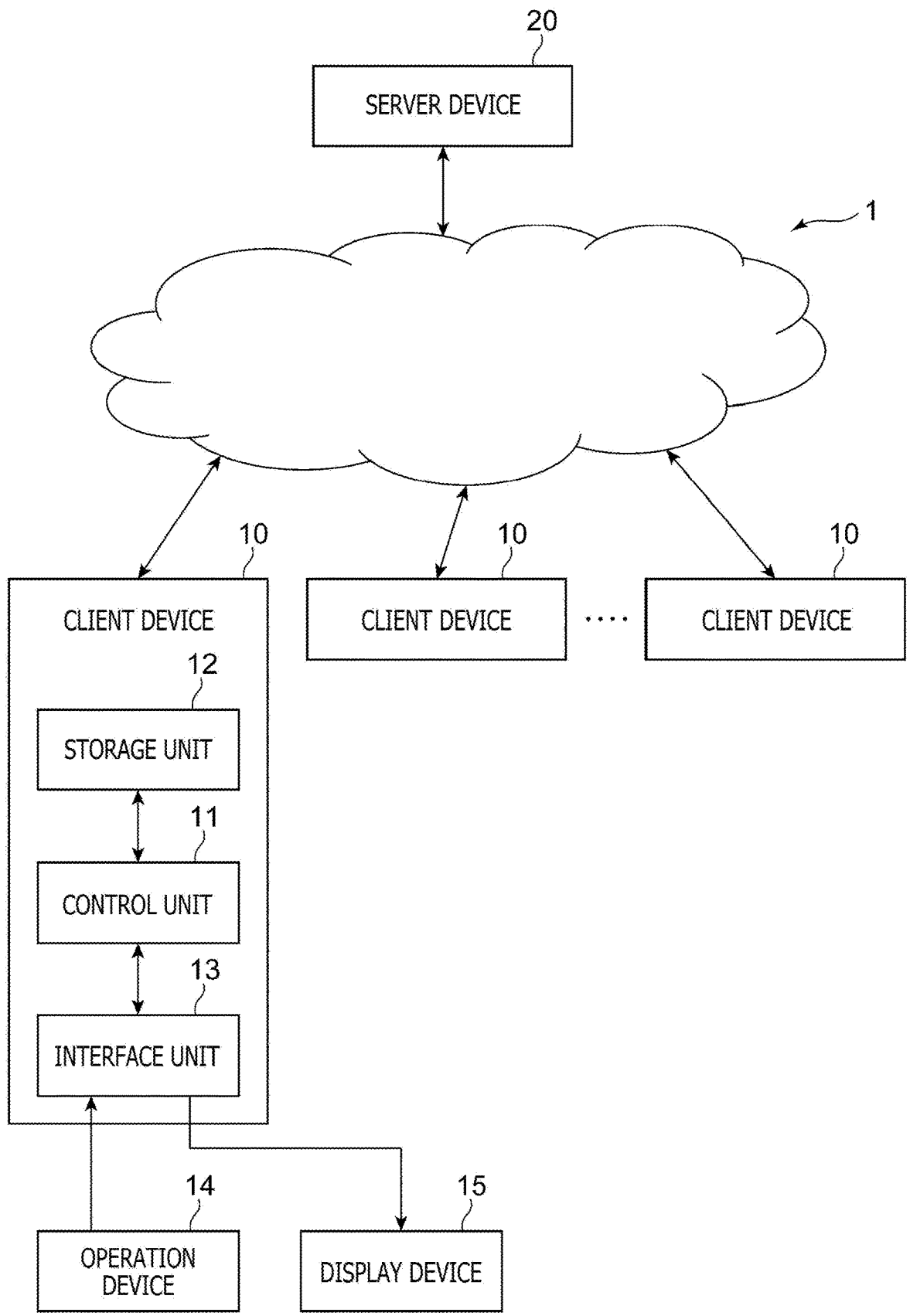
FIG. 1 is a configuration block diagram of an information processing system that includes client devices which are information processing devices according to an embodiment of the present invention.

FIG. 1 is a configuration block diagram that illustrates an overall outline of an information processing system 1 that includes client devices 10 which are information processing devices according to an embodiment of the present invention. As illustrated in the same figure, the information processing system 1 includes a plurality of client devices 10 and a server device 20.

Each client device 10 is an information processing device such as a home game device, a personal computer, or a smart phone, for example, and is used to distribute a video to someone else, or view a video that someone else distributes. For convenience in the following description, out of users who use the respective client devices 10, a user who distributes a video to other people is referred to as a distributing user. In addition, a user who views a video that someone else distributes is referred to as a viewing user. As illustrated in FIG. 1, a client device 10 includes a control unit 11, a storage unit 12, and an interface unit 13. The client device 10 is also connected to an operation device 14 and a display device 15.

The control unit 11 includes at least one processor such as a CPU (Control Processing Unit), and executes a program stored in the storage unit 12 to execute various kinds of information processing. Note that specific examples of processing executed by the control unit 11 in the present embodiment are described below. The storage unit 12 includes at least one memory device such as a RAM (Random Access Memory), and stores the program that the control unit 11 executes and data that is to be processed by the program.

The interface unit 13 is an interface for performing data communication with the operation device 14 and the display device 15. The client device 10 is connected, via the interface unit 13 and by wire or wirelessly, to the operation device 14 and the display device 15. Specifically, it is assumed that the interface unit 13 includes a multimedia interface for HDMI (registered trademark) (High-Definition Multimedia Interface) or the like in order to transmit video data supplied by the client device 10 to the display device 15. In addition, the interface unit 13 includes a data communication interface for USB (Universal Serial Bus) or the like, in order to receive an operation signal indicating content of a user operation accepted by the operation device 14.

Furthermore, in the present embodiment, it is assumed that the interface unit 13 includes a communication interface for a LAN (Local Area Network) or the like in order to send and receive data to and from another information processing device via a communication network such as the Internet. Via the interface unit 13, the client device 10 is communicably connected to other client devices 10 and the server device 20.

The operation device 14 is, for example, a dedicated controller for a home game device, and accepts an operation instruction from a user and transmits an operation signal indicating content thereof to the client device 10.

The display device 15 displays a video according to a video signal transmitted from the client device 10, and allows the user to view the video. The display device 15 may be a stationary display device such as a home television receiver. The display device 15 may also be, for example, a head-mounted display that the user uses by mounting it to his/her head.

The server device 20 is a server computer that is communicably connected to each client device 10. The server device 20 in the present embodiment manages distribution of videos by the client devices 10. Specifically, the server device 20 accepts registration from each user who uses a service that the information processing system 1 provides, and manages information thereof. When a user of a client device 10 attempts to distribute a video, the server device 20 receives the distributed video and distributes the distributed video to another client device 10 that makes a viewing request.

Figure 2:
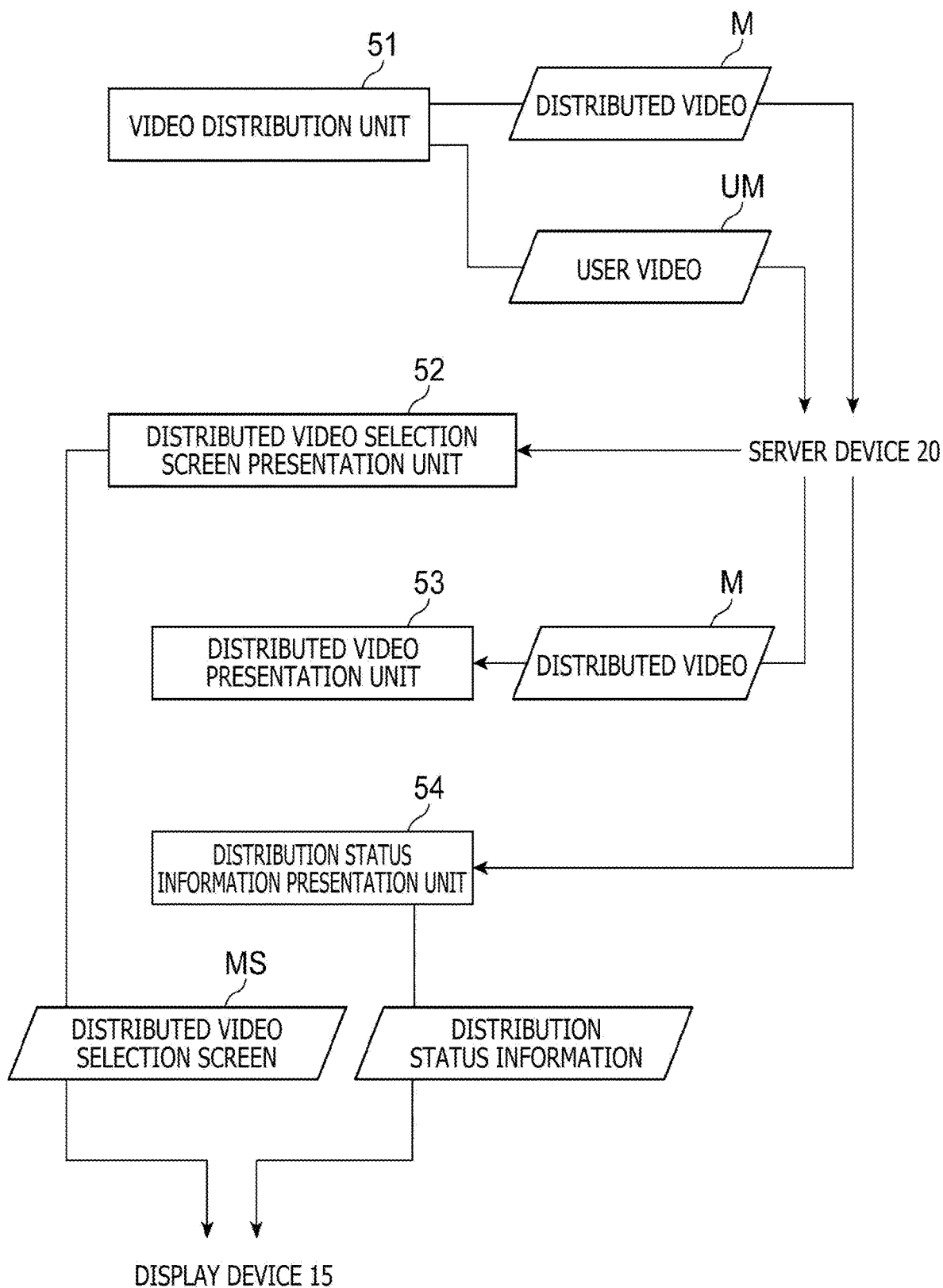
FIG. 2 is a functional block diagram of a client device.

Next, with reference to FIG. 2, description is given regarding functionality that each client device 10 realizes. As illustrated in FIG. 2, the client device 10 functionally includes a video distribution unit 51, a distributed video selection screen presentation unit 52, a distributed video presentation unit 53, and a distribution status information presentation unit 54. These functions are realized by the control unit 11 executing the program stored in the storage unit 12. This program may be provided to the client device 10 via a communication network such as the Internet, or may be stored in a computer-readable information storage medium such as an optical disk and provided to the client device 10.

The video distribution unit 51 realizes distribution of a video from the client device 10 to another client device 10. It is assumed that the video distribution unit 51 in the present embodiment distributes a video that indicates a play status of a game. Specifically, while the client device 10 is executing a game program in order for the distributing user to play a game, the video distribution unit 51 distributes a video that represents a screen of the game in accordance with an instruction by the distributing user. A video that includes a game screen distributed by the video distribution unit 51 is referred to as a distributed video M below. It is assumed that the distributed video M is a video that includes a moving image having the same content as the game screen that is displayed on a display region of the display device 15 to be presented to the distributing user, and game audio that is reproduced from a speaker to be presented to the user. Note that the video distribution unit 51 in the present embodiment first transmits the distributed video M to the server device 20.

Together with the distributed video M that includes the game screen, the video distribution unit 51 may also distribute a video that includes a moving image obtained by a camera capturing a situation of the distributing user who is playing the game or audio obtained by a microphone recording audio of content uttered by the distributing user. A video obtained by capturing or recording audio of the distributing user is referred to below as a user video UM.

The distributed video selection screen presentation unit 52 renders a distributed video selection screen MS and displays the distributed video selection screen MS on the display region of the display device 15 if the user of the client device 10 wishes to view, as a viewing user, a video distributed by someone else. The distributed video selection screen MS is a screen for allowing a viewing user to select from a plurality of distributed videos M that are being distributed at the timing when the screen is displayed, and includes thumbnail images TI that represent respective distributed videos M. A thumbnail image TI may be a still image such as a screenshot of a distributed video M. In addition, the thumbnail image TI may be updated, such as to another screenshot, every predetermined time period.

On each thumbnail image TI, the distributed video selection screen presentation unit 52 displays in association a user image UI representing the user who is performing the distribution. The user image UI may be an avatar image, a photograph image, or the like that each user has registered in advance in the server device 20.

Further, when a viewing user has one of the distributed videos M in a selected state, the distributed video selection screen presentation unit 52 displays a preview video PM in place of the thumbnail image TI for the distributed video M. The preview video PM may be a video that performs a reduced display of the distributed video M that is actually being distributed. In a state where the distributed video selection screen MS is presented, the viewing user, while confirming the preview video PM or distribution status information that is described below, selects the distributed video M that the viewing user wants to view, and performs an operation to instruct the start of viewing. In response to this operation, the distributed video presentation unit 53, which is described below, starts display of the selected distributed video M.

The distributed video selection screen presentation unit 52 obtains, from the server device 20, information on distributed videos M that are selection candidates as well as on the users who are performing the distribution thereof. Specifically, if display of the distributed video selection screen MS is instructed by the viewing user, the distributed video selection screen presentation unit 52 queries the server device 20 regarding the distributed videos M that are currently being distributed. In response to this query, the server device 20 transmits, to the client device 10 that has made the query, information regarding the distributed videos M that are currently being distributed, such as the username or user image UI of the distributing user who is performing the distribution, a type of the game included in the distributed video M, and the thumbnail image TI of the distributed video M. The distributed video selection screen presentation unit 52 uses this information received from the server device 20 to render a distributed video selection screen MS for allowing the viewing user to select from the distributed videos M that are currently being distributed.

If, in a state where the distributed video selection screen MS is presented, the viewing user selects one distributed video M and makes an instruction to start viewing thereof, the distributed video presentation unit 53 starts reproduction of the distributed video M. Specifically, the distributed video presentation unit 53 transmits to the server device 20 a distribution request for the selected distributed video M. In response to this distribution request, the server device 20 distributes the requested distributed video M to the client device 10 that is the request source. The distributed video presentation unit 53 receives the distributed video M that is distributed from the server device 20, and causes the distributed video M to be displayed on the display region of the display device 15. The distributed video presentation unit 53 may also display the user video UM, which is being distributed with the distributed video M, in alignment with the distributed video M.

Further, while the distributed video M is being presented, the distributed video presentation unit 53 accepts posting of a comment with respect to the distributed video M. The distributed video presentation unit 53 transmits the posted comment to the server device 20. The distributed video presentation unit 53 also receives, from the server device 20, comments posted by other viewing users with respect to the distributed video M, and displays these comments on the display region of the display device 15 as needed. By this, while viewing the distributed video M, the viewing user can view in real time comments from other viewing users that are posted at any time, and can himself/herself post a comment addressed to the distributing user or another viewing user.

When the distributed video selection screen presentation unit 52 presents the distributed video selection screen MS, the distribution status information presentation unit 54 presents, in association with the image (thumbnail image TI or preview video PM) representing each distributed video M, distribution status information indicating the distribution status of the distributed video M. More specifically, for each distributed video M presented in the distributed video selection screen MS, the distribution status information presentation unit 54 obtains from the server device 20 information indicating the number of viewers for the distributed video M, as the distribution status information. The number of viewers may be the total number of viewing users who are currently viewing the distributed video M at that time, and may be the cumulative number of viewing users from when distribution of the distributed video M started until the current time.

The distribution status information presentation unit 54, having obtained the information indicating the number of viewers, displays an image representing the number of viewers for each distributed video M (hereinafter, referred to as a viewer image VI) in association with the thumbnail image TI of the corresponding distributed video M. It is assumed that the viewer image VI includes a plurality of unit images that represent the viewers, and is an image that represents the number of viewers by this number of unit images. The distribution status information presentation unit 54 determines the number of unit images to display according to the actual number of viewers obtained from the server device 20, and displays the viewer image VI that includes the determined number of unit images in the vicinity of the thumbnail image TI. Specifically, it is assumed that the viewer image VI includes a larger number of unit images the larger the number of viewers of the distributed video M there are. The plurality of unit images are arranged in the vicinity of the thumbnail image TI, following a perimeter thereof. By arranging the viewer image VI outside of the thumbnail image TI, it is possible to make it so that the viewer image VI does not hide the thumbnail image TI.

Figure 3:
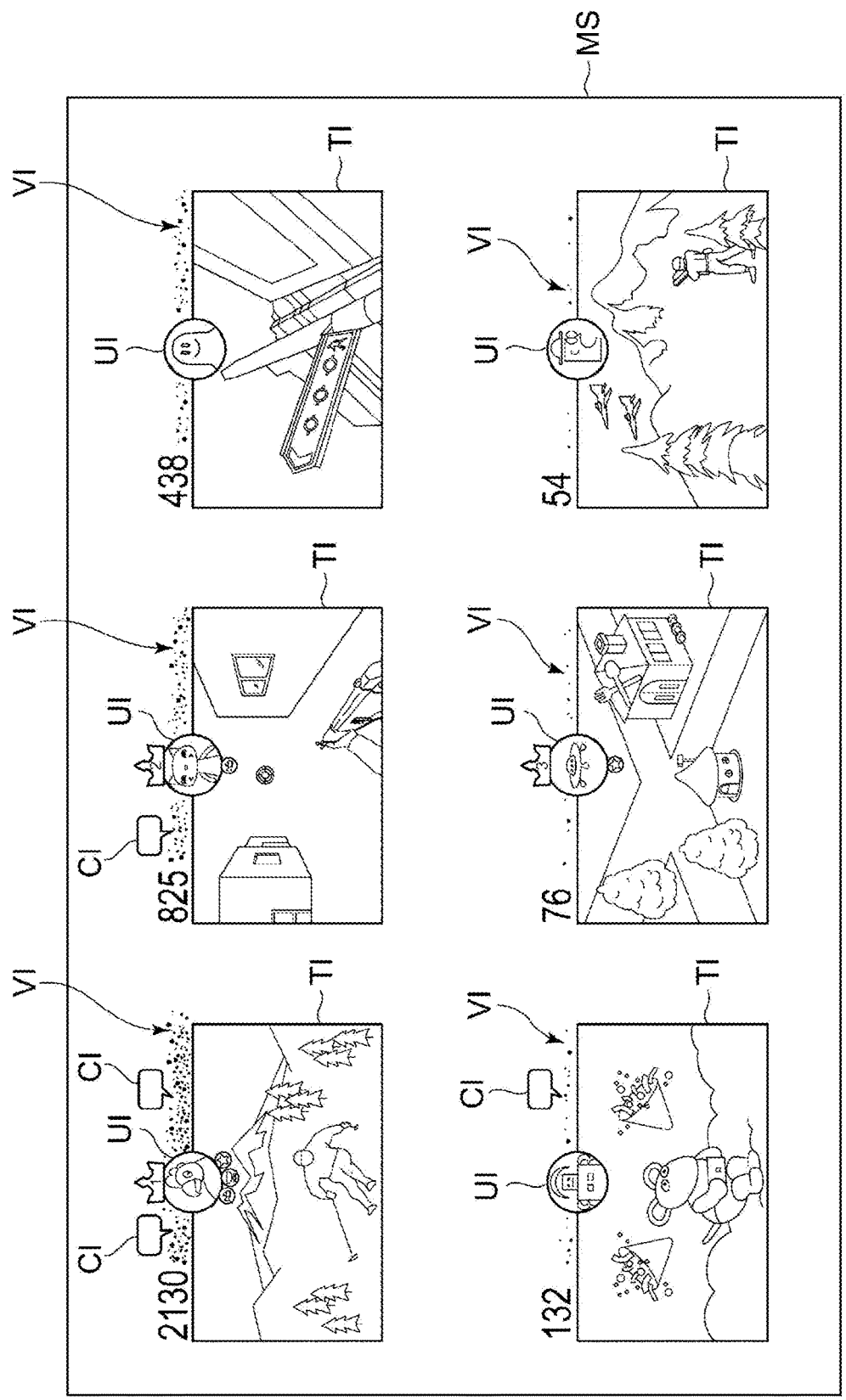
FIG. 3 is a view that illustrates an example of a distributed video selection screen.

FIG. 3 illustrates an example of the distributed video selection screen MS in which viewer images VI that include such a plurality of unit images are arranged along top edges of thumbnail images TI. In the example of FIG. 3, each unit image is a dot image that has a circular shape, and the position and size of each dot image is randomly determined. By randomly determining the position of each dot image, it is possible to represent a situation in which the viewers are scattered. In addition, by randomly determining the sizes of the dot images, it is possible to give an impression that the viewers are scattered at various positions in a depth direction as well. Furthermore, the distribution status information presentation unit 54 may display, as an animation, a situation in which the position and size of the dot images randomly change over time. By randomly changing the position or size in this manner, it is possible to give an impression that mere dot images are a crowd. In the example in FIG. 3, in addition to the viewer images VI, the number of viewers itself is displayed on the left above each thumbnail image TI. However, through the viewer images VI, a viewing user can intuitively recognize whether the number of viewers for each distributed video M is big or small without reading the number.

Note that an upper limit may be provided for the number of unit images displayed at once for each distributed video M. In this case, it is assumed that, for a distributed video M that is currently being viewed by viewers in excess of a predetermined number, a predefined number (maximum number) of unit images are displayed as the viewer image VI, and the number of unit images is not caused to change even if the number of viewers increases further. Alternatively, of distributed videos M presented on the distributed video selection screen MS, the one having the largest number of viewers may be made to correspond to the maximum number of unit images, and the number of unit images displayed for other distributed videos M may be determined to be in the same ratio as the ratio of the maximum number of unit images with respect to the largest number of viewers. In addition, if a large number of viewers are viewing a distributed video M, instead of merely increasing the number of unit images, a range (a difference between a maximum value and a minimum value) of the size of the unit images may be increased to thereby give an impression that many people are present in the depth direction.

Furthermore, the distribution status information presentation unit 54 displays, as information indicating the distribution status of each distributed video M, an image (hereinafter, referred to as a comment image CI) indicating that a comment has been posted with respect to the distributed video M. The comment image CI is subject to a pop-up display at a timing according to the timing when the comment was posted with respect to the distributed video M, and is deleted when a predetermined time period elapses. The comment image CI does not need to include the content of the comment itself. By displaying such a comment image CI, a viewing user can easily recognize a distributed video M for which comments are frequently posted. In the example of FIG. 3, the comment image CI has a speech balloon shape, and is displayed further above the viewer image VI (on the side opposite the thumbnail image TI side as seen from the viewer image VI). By displaying the comment image CI at a position adjacent to the viewer image VI in this fashion, it is possible to represent a situation in which viewers are expressing comments. In addition, by displaying the comment image CI at the side opposite the thumbnail image TI side, it is possible to make it so that the thumbnail image TI is not hidden by the comment image CI.

In the example of FIG. 3, information indicating attributes of the distributing user are displayed together with the user image UI. Specifically, the user image UI in the example of FIG. 3 is arranged so as to partially overlap the thumbnail image TI, near the center of the top edge of the thumbnail image TI. An image resembling a crown is arranged overlapping the top of the some user images UI, and a number is displayed therein. This image indicates that this is a distributing user whose rank in a predetermined ranking such as a ranking for a game tournament in the past or a ranking for the number of viewers is high, and indicates the rank thereof. In addition, one or a plurality of images resembling a badge indicating an attribute of the distributing user, actual results that the distributing user has obtained, or the like are arranged below some user images UI. The information relating to rankings, attributes, actual results, or the like may all be managed by the server device 20 and provided to each client device 10.

Figure 4:
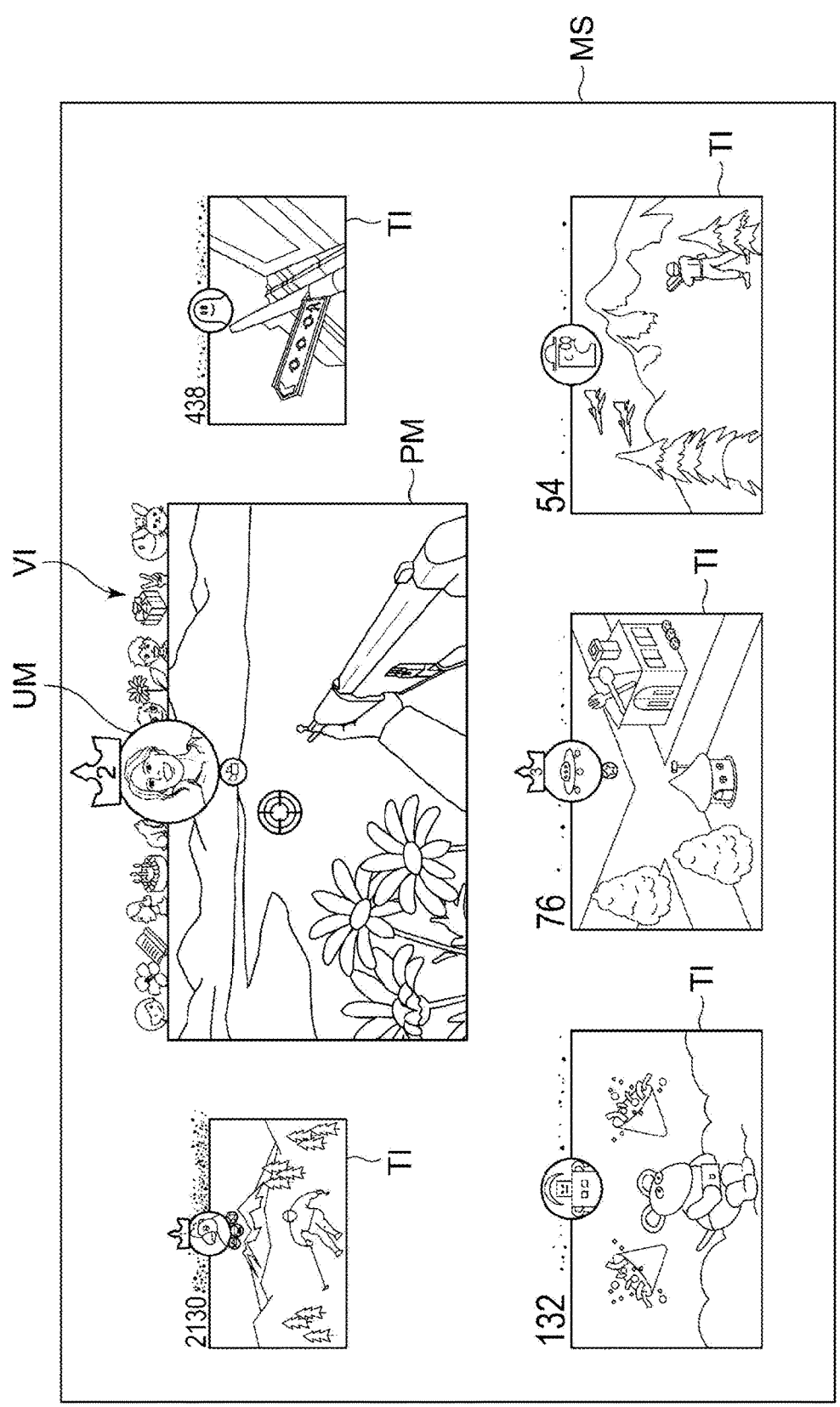
FIG. 4 is a view that illustrates an example of a screen in which a preview video of a distributed video is displayed.

Furthermore, it is assumed that, in a state where a preview video PM is displayed, the distribution status information presentation unit 54 displays more detailed information regarding the distribution status of the distributed video M corresponding to the preview video PM. FIG. 4 illustrates an example of a distributed video selection screen MS in a state where such a preview video PM is displayed.

As illustrated in FIG. 4, in a state where a preview video PM is displayed, the unit images included in the viewer image VI are changed from dot images to user images UI for viewing users who are actually viewing the distributed video M. These user images UI may be avatar images that are registered in advance in the server device 20 by each viewing user, similarly to the user image UI for the distributing user. Similarly to the case for dot images, for the viewer image VI configured by these user images UI, the number of user images UI included also increases the greater the number of viewers. By this, a viewing user can intuitively recognize a distributed video M having a greater number of viewers.

Note that it is desirable for the display position of the viewer image VI relative to the preview video PM to be at the same position as the display position for the viewer image VI relative to the thumbnail image TI before the preview video PM is displayed. By this, a viewing user can make a comparison between before and after the preview video PM is displayed to thereby easily understand that the dot images and the user images UI included in the viewer image VI both represent viewers. Specifically, in the example of FIG. 4, the viewer image VI is arranged along the top edge of the preview video PM so as not to overlap the preview video PM, similarly to the viewer images VI being arranged along the top edge of the thumbnail images TI in FIG. 3.

The user images UI included in the viewer image VI when a detailed display is performed may be user images UI for viewing users selected in accordance with given criteria, from the viewing users who are actually viewing the corresponding distributed video M. The given criteria for selecting user images UI to be displayed in this case may be criteria such as selecting viewing users who have posted a large number of comments, or selecting users who have a high usage amount of a service provided by the information processing system 1 or who have made many monetary payments with respect to this service, for example. In addition, criteria relating to a game play status by each user (such as the number of trophies obtained, which can be obtained in the game when predetermined conditions are satisfied) may be used. In any case, the server device 20 manages information necessary for selecting the user images UI in accordance with such criteria, and, upon accepting a request from a client device 10, selects the viewing users to be displayed in accordance with such criteria, and transmits the user images UI for the selected viewing users to the client device 10 that is the request source.

In addition, if the preview video PM is displayed, the distribution status information presentation unit 54 may reproduce and display a portion of the user video UM in place of the user image UI for the distributing user. Specifically, in FIG. 4, the user video UM that is being distributed by the same distributing user is reproduced and displayed as a moving image in the region (a user display region here) where the user image UI for the distributing user is displayed in FIG. 3. At this time, it is assumed that what is displayed in the user display region is not the entirety of the user video UM, but a portion thereof. The portion displayed in the user display region may be a portion in which the face of the distributing user appears. Specifically, when displaying the preview video PM, the distribution status information presentation unit 54 also accepts distribution of the user video UM from the server device 20, and recognizes a face region included in this video. A region having a predetermined shape (for example, a circle) that circumscribes the recognized face region is clipped and displayed in the user display region. By this, a viewing user can select the distributed video M to view while confirming the situation that the distributing user is distributing. Further, by displaying the user video UM in place of the user image UI in the user display region where the user image UI has been displayed thus far, a viewing user can easily recognize that what is displayed in the user display region is the distributing user. In addition, because there is no need to separately ensure a region for displaying the user video UM, it is possible to display the user video UM in a form that is less likely to obstruct display of the preview video PM.

Further, it is assumed that, in a state where a preview video PM is displayed, if a comment is posted with respect to the distributed video M corresponding to the preview video PM, the distribution status information presentation unit 54 displays detailed information regarding this comment. Specifically, in place of a comment image CI that resembles a speech balloon, the distribution status information presentation unit 54 displays the content (message) of the comment itself outside of the preview video PM. In this case, the content of the comment may also be displayed on a side opposite the preview video PM as seen from the viewer image VI, similarly to the comment images CI. Furthermore, in a case of displaying detailed information regarding the distribution status, the viewing user may be presented with information indicating the user who posted a comment along with the content of the comment.

Figure 5:
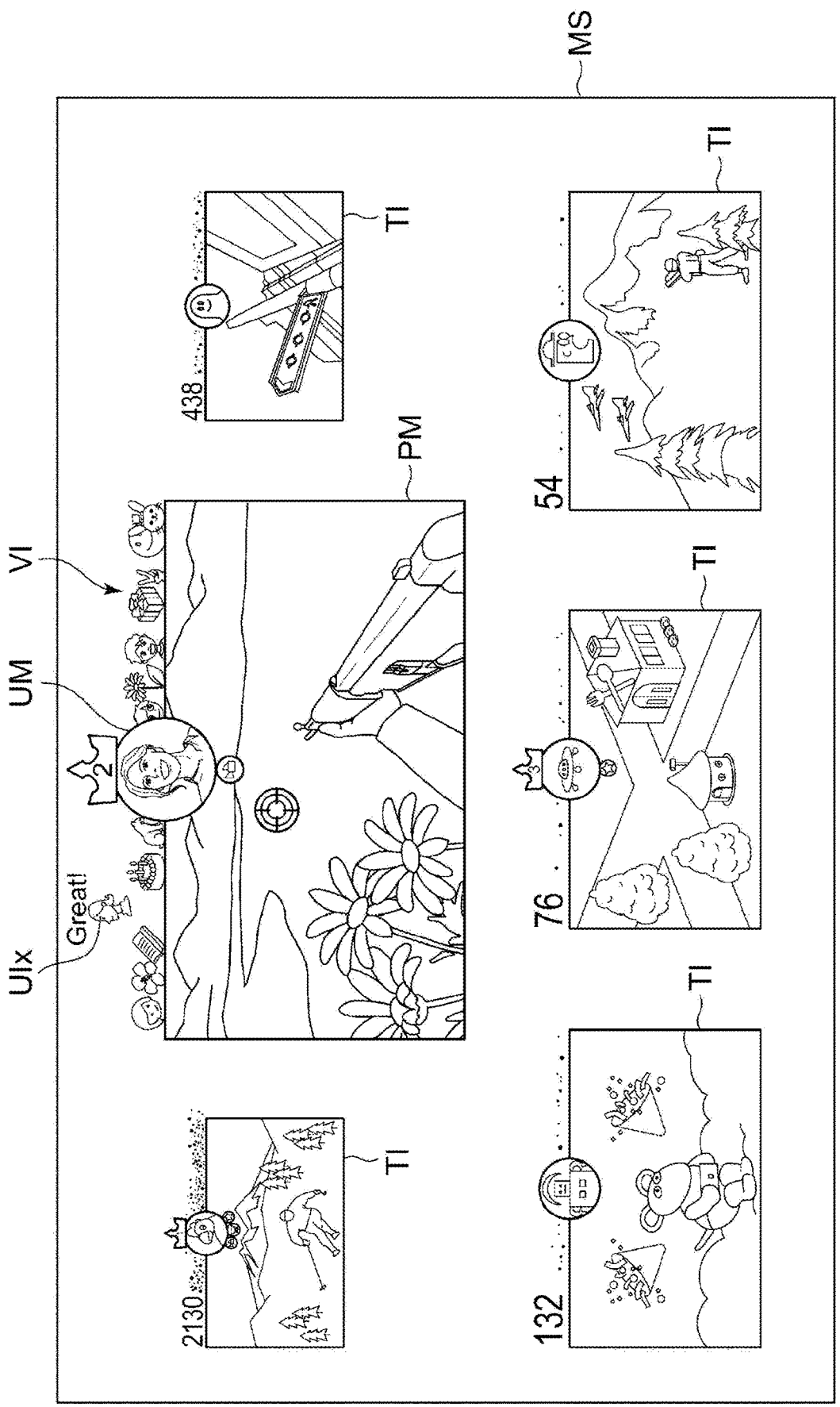
FIG. 5 is a view that illustrates a display example for a case where a comment is posted in a state where a preview video for a distributed video is displayed.

FIG. 5 illustrates a display example for a case where, in a state where a preview video PM as exemplified in FIG. 4 is displayed, a comment is posted with respect to the corresponding distributed video M. In the example of this figure, the content of the comment "Great!" is displayed above the viewer image VI, and a situation in which a user image UIx for the user who actually posted the comment, out of user images UI included in the viewer image VI, shifts upward from the position where it has been displayed thus far is displayed as an animation below the comment. By this, it is possible to represent the situation in which the user represented by the user image UIx posts the content of the comment, and the viewing user can recognize who posted the comment. If a user whose user image UI has not been displayed thus far posts a comment, both newly displaying the user image UI of the user who posted the comment and displaying the content of the posted comment may be performed.

As described above, by virtue of the client device 10 according to the present embodiment, when presenting a distributed video selection screen MS for allowing a viewing user to select a distributed video M to be viewed, it is possible to present the distribution status for each distributed video M that is a selection candidate in a form that is easy to understand for the viewing user.

Note that embodiments of the present invention are not limited to that described above. For example, the layout and content displayed by the distributed video selection screen MS in the description above are all merely examples. In addition, the content or arrangement of the distribution status information presented by the distribution status information presentation unit 54 is not limited to that described above. For example, the unit images included in the viewer image VI are not limited to dot images, and may be various shapes such as a humanoid image, for example. In addition, when displaying an avatar image as a unit image, the avatar image may be selected from candidate images prepared in advance instead of a user image UI associated with the user who is actually viewing the distributed video M. In addition, the position where the viewer image VI is arranged is not limited to the top edge of the thumbnail image TI or the preview video PM, and may be arranged along another edge. In the above description, displaying distribution status information together with a preview video PM is given after displaying a thumbnail image TI which is a still image that corresponds to each distributed video M in the distributed video selection screen MS, but a preview video PM may be displayed in place of the thumbnail image TI from the start.

In addition, at least some of the processing which is given as being executed by the server device 20 in the above description may be executed by the client device 10. Content of processing given as being executed by a single server device 20 in the above description may be realized by a plurality of server devices. For example, both the management of distributing users and viewing users and the distribution of distributed videos M are given as being executed by the server device 20 in the above description, but distribution of distributed videos M may be realized by a distribution server that is separate from the server device 20. In this case, it is assumed that a client device 10 that performs distribution notifies the server device 20 of the status of the distribution at timings such as when the distribution starts and when the distribution ends, and the server device 20 manages the distribution status for each client device 10 on the basis of the notified information. In addition, each client device 10 may directly distribute the distributed video M to other client devices 10 without going through the server device 20 or another distribution server.

REFERENCE SIGNS LIST

1: Information processing system
10: Client device
11: Control unit
12: Storage unit
13: Interface unit
14: Operation device
15: Display device
20: Server device
51: Video distribution unit
52: Distributed video selection screen presentation unit
53: Distributed video presentation unit
54: Distribution status information presentation unit

The invention claimed is:

1. An information processing device comprising:
a distributed video selection screen presentation unit that presents to a user a distributed video selection screen that includes a plurality of distributed videos as selection candidates; and
a distribution status information presentation unit that presents, in the distributed video selection screen and in association with each of the plurality of distributed videos, distribution status information relating to a distribution status of the distributed video, wherein
as the distribution status information, the distribution status information presentation unit displays, in a vicinity of an image that represents a corresponding distributed video, a viewer image that includes a number of unit images determined according to the number of viewers who are currently viewing the corresponding distributed video, and
the distribution status information presentation unit causes the unit images to randomly change in size such that a cumulative shape and content of the unit images appears to the user as a crowd.

2. The information processing device according to claim 1, wherein the distribution status information presentation unit causes the unit images to randomly change in size.

3. The information processing device according to claim 1, wherein the distribution status information presentation unit displays a viewer image including, as the unit images included in the distribution status information relating to the distribution status of at least one of the plurality of distributed videos, a plurality of user images each associated with one of the viewers who are currently viewing the distributed video.

4. The information processing device according to claim 1, wherein the distribution status information presentation unit displays, as the distribution status information, a comment image indicating that a comment has been posted to the corresponding distributed video, at a timing according to the timing when the comment is posted.

5. The information processing device according to claim 1, wherein
the distribution status information presentation unit displays, in association with each of the plurality of distributed videos, a user image that represents a distributing user who is currently distributing the distributed video, and
if one of the plurality of distributed videos enters a selected state, the distribution status information presentation unit displays a user video obtained by capturing the distributing user in place of the user image associated with the distributed video in the selected state.

6. An information processing method comprising:

presenting to a user a distributed video selection screen that includes a plurality of distributed videos as selection candidates; and presenting, in the distributed video selection screen and in association with each of the plurality of distributed videos, distribution status information relating to a distribution status of the distributed video, wherein in the presenting distribution status information, as the distribution status information in a vicinity of an image that represents a corresponding distributed video, a viewer image that includes a number of unit images determined according to the number of viewers who are currently viewing the corresponding distributed video is displayed, and the presenting includes causing the unit images to randomly change in size such that a cumulative shape and content of the unit images appears to the user as a crowd.

7. A non-transitory, computer readable storage medium containing a computer program, which when executed by a computer, causes the computer to perform an information processing method by carrying out actions:

presenting to a user a distributed video selection screen that includes a plurality of distributed videos as selection candidates; and presenting, in the distributed video selection screen and in association with each of the plurality of distributed videos, distribution status information relating to a distribution status of the distributed video, wherein in the presenting distribution status information, as the distribution status information in a vicinity of an image that represents a corresponding distributed video, a viewer image that includes a number of unit images determined according to the number of viewers who are currently viewing the corresponding distributed video is displayed, and the presenting includes causing the unit images to randomly change in size such that a cumulative shape and content of the unit images appears to the user as a crowd.

* * * * *